United States Patent [19]

Chen

[11] Patent Number: 5,395,069
[45] Date of Patent: Mar. 7, 1995

[54] TWO-STAGE BRAKE DEVICE OF A TAPE MEASURE

[76] Inventor: Chi-Chung Chen, No.22-1,Ta Hwu Ding, Tuh Keng Village, Kuei Shan Hsiang, Taoyuan Hsien, Taiwan, Prov. of China

[21] Appl. No.: 287,887

[22] Filed: Aug. 9, 1994

[51] Int. Cl.⁶ ............................................... G01B 3/10
[52] U.S. Cl. ................................. 242/381.3; 33/767; 188/69
[58] Field of Search .................. 188/68, 69; 242/381.1–381.6; 33/767, 754

[56] References Cited

U.S. PATENT DOCUMENTS

| | | | |
|---|---|---|---|
| 4,194,703 | 3/1980 | Roe | 242/381.3 |
| 4,903,912 | 2/1990 | Coughlin | 33/767 |
| 4,976,048 | 12/1990 | Blackman | 242/381.3 |
| 4,998,356 | 3/1991 | Chapin | 242/381.3 |
| 5,001,843 | 3/1991 | Chapin | 242/381.3 |
| 5,007,178 | 4/1991 | Dewive et al. | 33/767 |
| 5,210,956 | 5/1993 | Knispel et al. | 33/767 |

*Primary Examiner*—Robert J. Oberleitner
*Assistant Examiner*—Chris Schwartz
*Attorney, Agent, or Firm*—Bacon & Thomas

[57] ABSTRACT

A two-stage brake device of a tape measure, comprising a locking brake mechanism and a pull brake mechanism, wherein the locking brake mechanism includes a pivotable driving button for urging a brake plate to brake the tape and the pull brake mechanism includes an elastic pressing button having an integrally formed pressing plate, whereby when the pressing button is free from any pressing force, the pressing plate is elastically urged to press against the tape and substantially fix the tape at a desired extending length. While when the pressing button is pressed, the pressing plate is released and disengaged from the tape, permitting the tape to elastically retract into a housing of the tape measure.

1 Claim, 4 Drawing Sheets

TWO-STAGE BRAKE DEVICE OF A TAPE MEASURE

BACKGROUND OF THE INVENTION

1. Field of the Invention

The present invention relates to a two-stage brake device of a tape measure, which has simple components and fixes the tape at a desired extending length by means of the elasticity of the components so as to effectively control and locate the tape by two stages and ensure safe use thereof.

2. Brief Description of the Prior Art

A conventional tape measure includes a housing, a reel disposed in the housing and a tape elastically extensibly wound on-the reel by a coil spring. A user can linearly pull the tape out of the housing through an opening thereof for measuring a length or retract the tape into the housing after used. In addition, the conventional tape measure includes a brake device which is used to fix the tape at a certain length for facilitating the measuring operation. When the brake device is released, the tape is automatically retracted into the housing and wound on the reel by the elastic force of the coil spring.

According to the above arrangements, the brake device of the conventional tape measure only provides one-stage tape-fixing function and the tape cannot be simultaneously fixed as the tape is pulled and reaches a desired position. Instead, the tape must be fixed by additionally pushing the brake device. This is troublesome to the user during the measuring operation. Moreover, according to the above one-stage brake device, the tape is likely to unexpectedly automatically retract into the housing due to incautious pulling of the tape and controlling of the brake device. Because the elastically winding force of the coil spring is very large, the user's hands or even body is liable to be hurt by the suddenly retracting tape.

To solve the above problems, U.S. Pat. No. 5,007,178 entitled "measuring tape device" discloses a two-stage brake and control device for the tape, including a first brake mechanism and a second brake mechanism. The first brake mechanism is disposed at a bottom portion of the wound tape, having an actuator lever and an anvil member, wherein a compression spring pushes one end of the lever, making the other end thereof substantially engaged with the anvil member, whereby the tape passing between the lever and the anvil member is substantially fixed after pulled out by a certain length. By means of the elasticity of the compression spring, the tape can be freely pulled out without obstruction. The second brake mechanism is disposed on an oblique lateral side of the wound tape, having a slide button for controlling a slide member disposed inside the wound tape and actuating a force applying member, whereby when pushing the slide button, the force applying member is urged to press and brake or release the tape so as to actually lock the tape at a desired position.

According to the above arrangements of the prior U.S. Pat. No. 5,007,178, the inconveniences in use or operation of the conventional tape measure are eliminated and once pulled out of the housing, the tape is fixed without undesired retraction. Moreover, the slide button serves to actually prevent the tape from suddenly retracting into the housing. Therefore, the above technique achieves the purpose of safe and convenient use of the tape measure. However, a plurality of complicated and room-occupying parts are included in the above structure to achieve the brake function, especially in the second brake mechanism. Accordingly, these parts occupy most of the interior space of the housing and thus the volume and weight of the tape measure are considerably increased. Therefore, it is necessary to improve such structure by reducing the volume and weight of the tape measure and enhancing the operation efficiency thereof.

SUMMARY OF THE INVENTION

It is therefore a primary object of the present invention to provide a two-stage brake device of a tape measure. The brake device is composed of simple components and thus has less volume. In addition, the brake device fixes the tape at a desired extending length by means of the elasticity of the components so as to more conveniently and actually control and locate the tape and ensure safe use thereof. The two-stage brake device comprises a locking brake mechanism disposed on an oblique upper side of a housing of the tape measure and a pull brake mechanism disposed on a lower side of the housing. The locking brake mechanism includes a pivotable driving button and a brake plate driven thereby. An abutting recess portion is formed on a bottom portion of the driving button for abutting against the brake plate. The brake plate is a plastic-made frame member having a transverse cantilever extending from a lateral side of the brake plate through a central portion thereof, whereby when the driving button is pivoted back and forth by two stages, the abutting recess portion thereof pushes the brake plate, making the same displace up and down by two stages so as to brake and lock the tape. The pull brake mechanism includes an integrally formed pressing button and a spring fitted therewith. The pressing button includes an upper integrally formed pressing plate, whereby when the pressing button is free from any pressing force, the pressing plate is elastically urged to press against the tape and substantially fix the tape at a desired extending length. While when the pressing button is pressed, the pressing plate is released and disengaged from the tape, permitting the tape to elastically retract into the housing of the tape measure.

The present invention can be best understood through the following description and accompanying drawing, wherein:

DETAILED DESCRIPTION OF THE PREFERRED EMBODIMENT

Figure 1:
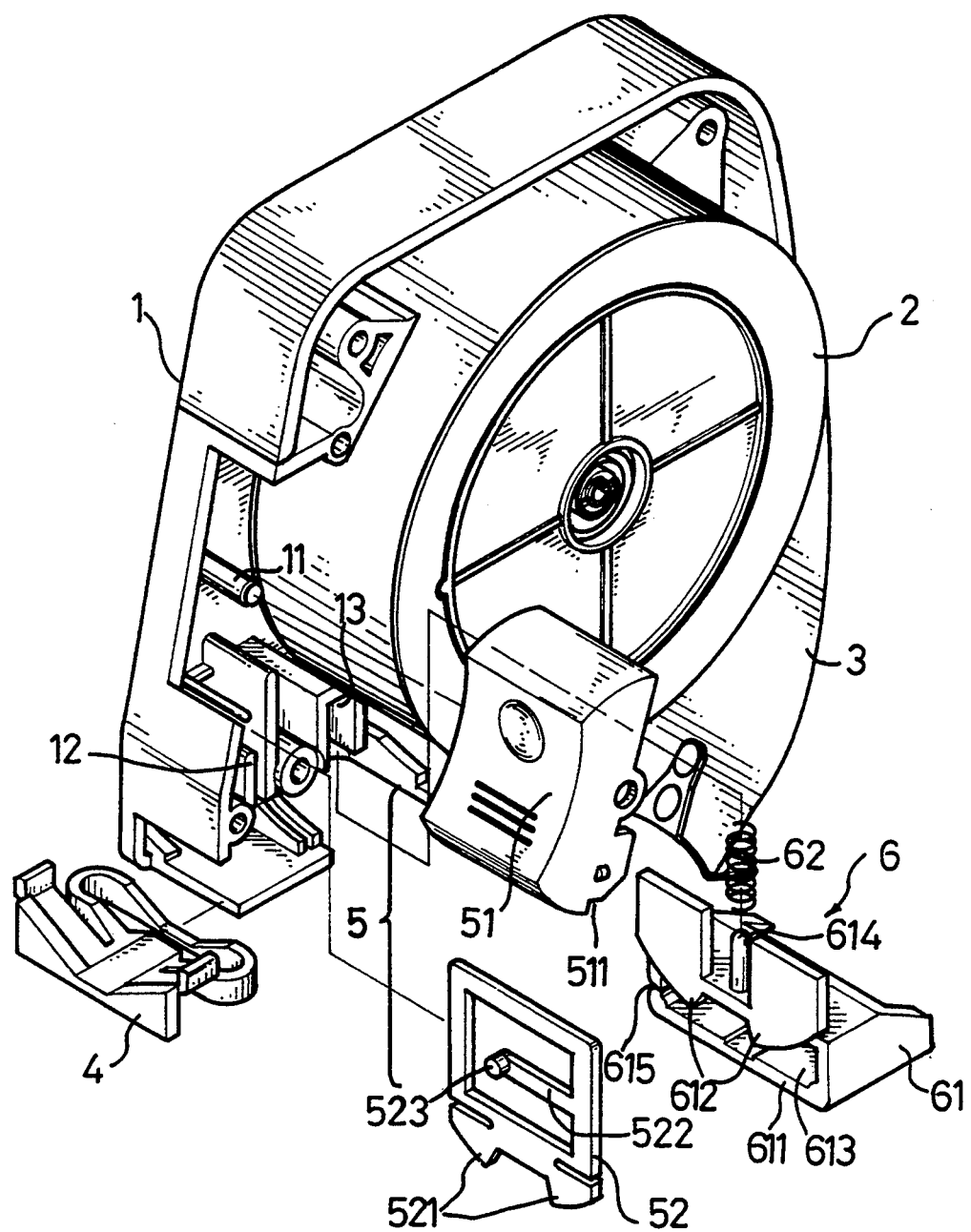
FIG. 1 is a perspective exploded view of the present invention.

Please first refer to FIG. 1. The tape measure of the present invention includes a housing 1 having an opening, a reel 2 disposed in the housing 1, a tape 3 extensibly wound on the reel 2, a stopper member 4 disposed at the opening of the housing 1 for stopping the tape 3 from retracting into the housing 1 and a two-stage brake device for braking and locating the tape 3 at a desired extending position.

The two-stage brake device includes a locking brake mechanism 5 disposed on an oblique upper side of the housing 1 and a pull brake mechanism 6 disposed on a lower side of the housing 1. The locking brake mechanism 5 includes a driving button 51 and a brake plate 52. The driving button 51 is pivotably fixed on a post 11 of the housing 1 and can be pivoted back and forth by two stages. An abutting recess portion is formed on a bottom of the driving button 51 for abutting against the brake plate 52 to create braking and releasing effect. The brake plate 52 is a plastic-made frame member having a lower stopping portion 521 shaped corresponding to the surface curvature of the tape 3. A transverse cantilever 522 extends from a lateral side of the brake plate 52 through a central portion thereof. A free end of the cantilever 522 is formed with a boss 523, whereby when the brake plate 52 is located in the housing 1, the boss 523 is engaged with an upper edge of an integrally formed wall 12 of the housing 1 and when the brake plate 52 is pressed, by means of the support of the boss 523 and the cantilever 522, the brake plate 52 is plastically displaced up and down, making the stopping portion 521 engage with the tape 3 and stop the same. When the driving button 51 is moved back and forth, the abutting recess portion 511 thereof pushes an upper edge of the brake plate 52, making the brake plate 52 plastically displace up and down by two stages as shown in FIGS. 2 and 3.

Figure 5:
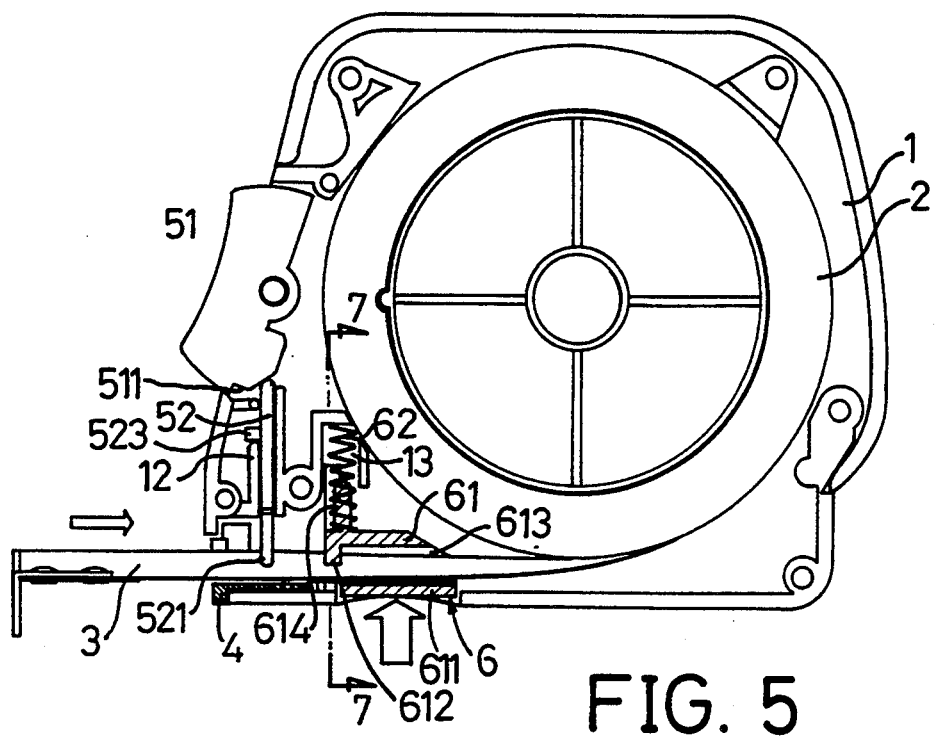
FIG. 5 is a sectional view according to FIG. 4, showing a pressed state of the pull brake mechanism thereof.
Figure 6:
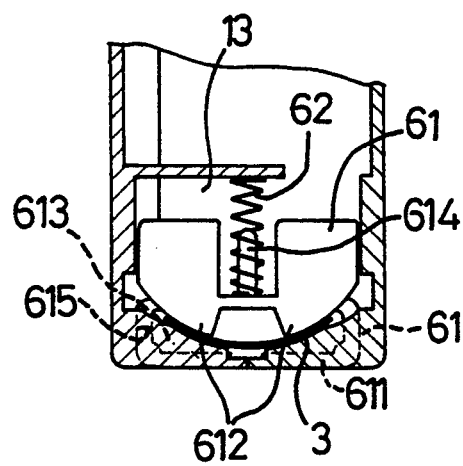
FIG. 6 is a sectional view taken along line A—A of FIG. 4.
Figure 7:
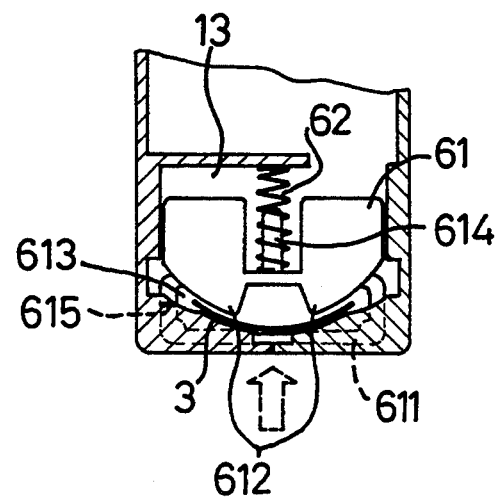
FIG. 7 is a sectional view taken along line B—B of FIG. 5.

The pull brake mechanism 6 includes a pressing button 61 and a spring 62. The pressing button 61 includes a bottom pressing base 611 and an upper vertical pressing plate 612. The pressing plate 612 and the pressing base 611 define a passage 613 for the tape 3 to pass therethrough. A post 614 is disposed on the pressing button 61 for fitting into the spring 62. A fissure 615 is formed on a lateral wall of the passage 613 as shown in FIGS. 6 and 7, whereby an upper and a lower walls of the passage 613 can be slightly plastically displaced. The assembly of the pressing button 61 and the spring 62 is placed on a lower side of the housing 1 with the spring 62 fitted in an integrally formed channel 13 of the housing 1 to elastically abut against and press the pressing button 61 downward, making a bottom of the pressing plate 612 press against the surface of the tape 3 as shown in FIG. 5. By means of the fissure 615 in cooperation with the spring 62, while pressed by the pressing plate 612, the tape 3 is prevented from being locked by the pressing plate 612 so that the tape 3 can be still freely pulled out of the housing 1 without obstruction. Moreover, after the tape 3 is extended by a desired length, the pressing plate 612 is able to substantially press and brake the tape 3 and prevent the same from elastically retracting into the housing 1.

Figure 2:
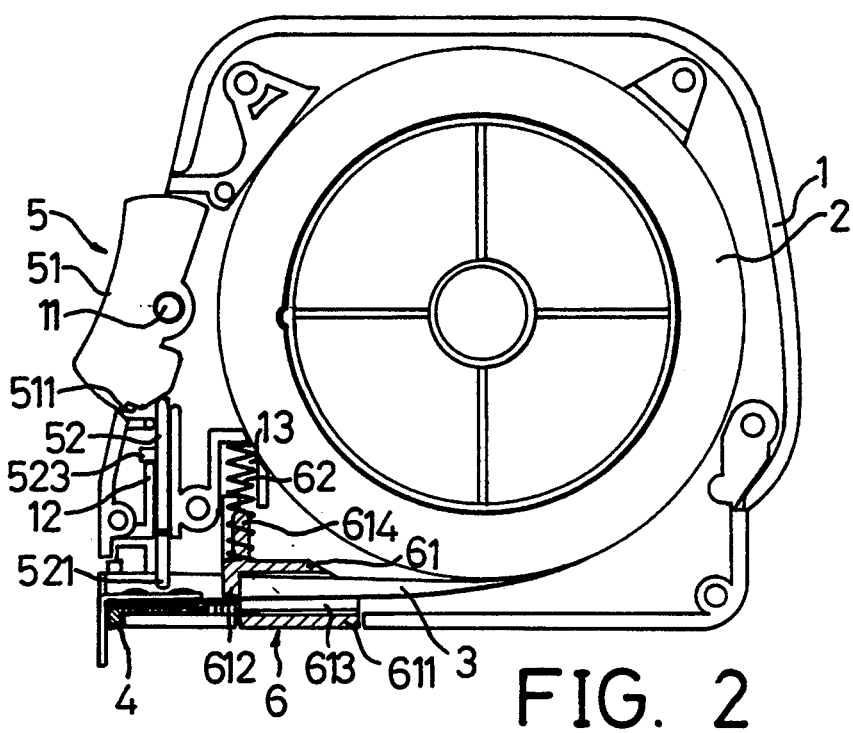
FIG. 2 is a sectional view showing a free state of the locking brake mechanism of the present invention.
Figure 3:
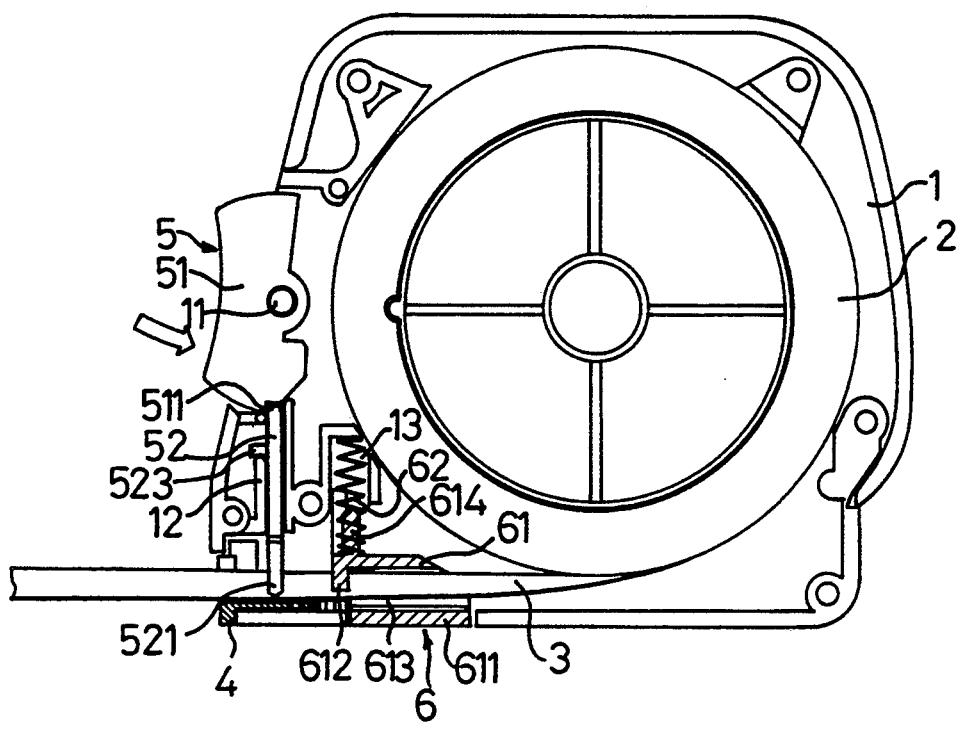
FIG. 3 is a sectional view according to FIG. 2, showing a pressed state of the locking brake mechanism thereof.

Please now refer to FIGS. 2 and 3 which show the operation of the locking brake mechanism 5. As shown in FIG. 2, when the driving button 51 is not forced downward, the brake plate 52 is free from any driving force and the boss 523 of the brake plate 52 is supported on the wall 12 to retain the brake plate 52 in an upper position. While as shown in FIG. 3, when the driving button 51 is forced downward in a direction shown by the arrow, the abutting recess portion 511 of the driving button 51 abuts against the brake plate 52, forcing the same downward to press against the tape 3. By means of the two-stage driving operation of the driving button 51, the brake plate 52 tightly presses against the tape 52 and lock the same. When the brake plate 52 is displaced downward, the boss 523 is still supported and located on the wall 12 of the housing 1 so that the cantilever 522 is plastically deformed. When the driving button 52 is pivoted back, the cantilever 522 is plastically restored, making the brake plate 52 elastically restored to the upper position.

Figure 4:
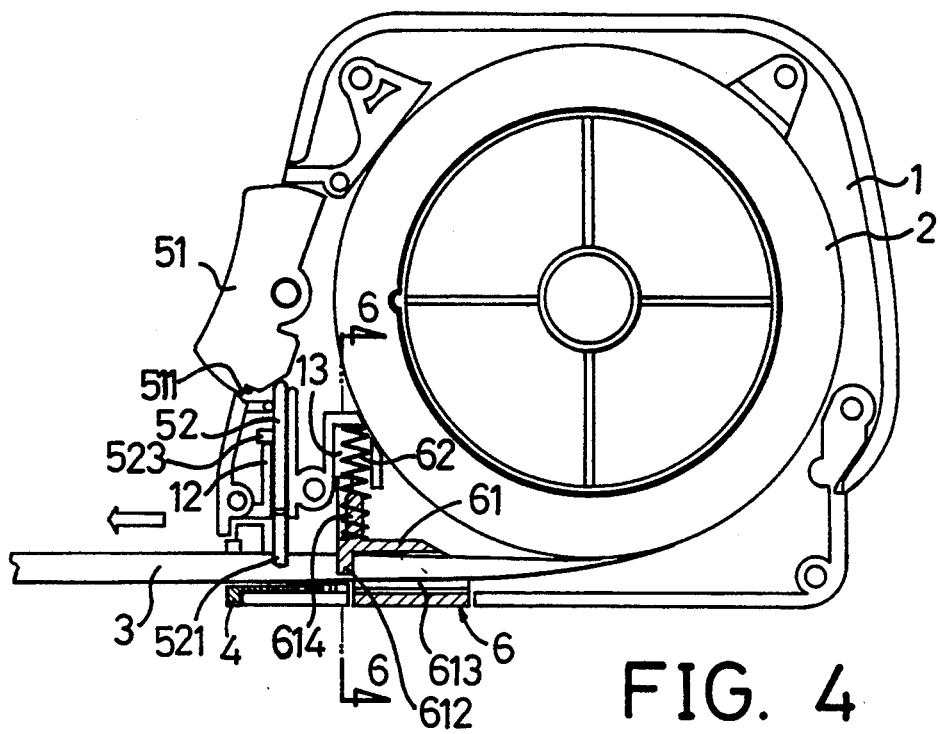
FIG. 4 is a sectional view showing a free state of the pull brake mechanism of the present invention.

Please now refer to FIGS. 4 to 7 which show the operation of the pull brake mechanism 6. When the pressing button 61 is not pressed as shown in FIGS. 4 and 6, the pressing plate 612 is pushed by the spring 62 to abut against the surface of the tape 3 and substantially fix the tape 3 without retraction. By means of the fissure 615 of the pressing plate 612, the same possesses suitable elasticity and thus will not fixedly lock the tape 3. Therefore, the tape 3 can be still freely pulled out of the housing 1. However, when the pressing base 611 of the pressing button 61 is forced upward as shown in FIGS. 5 and 7, the integrally formed pressing plate 612 is forced to elastically upward displace and disengage from the tape 3. At this time, the tape 3 is strongly retracted into the housing 1 by the elastic force of a coil spring disposed in the reel 2. Therefore, by means of the pressing button 61, the extension/retraction of the tape 3 can be freely controlled.

It is to be understood that the above description and drawings are only used for illustrating one embodiment of the present invention, not intended to limit the scope thereof. Any variation and derivation from the above description and drawings should be included in the scope of the present invention.

What is claimed is:

1. A two-stage brake device of a tape measure, said tape measure including a housing, a reel disposed in said housing and a tape extensibly wound on said reel, said two-stage brake device comprising a locking brake mechanism disposed on an oblique upper side of said housing and a pull brake mechanism disposed on a lower side of said housing, wherein:

said locking brake mechanism includes a driving button and a brake plate, said driving button being pivotably fixed on a post of said housing and adapted to be pivoted back and forth by two stages, an abutting recess portion being formed on a bottom portion of said driving button for abutting against said brake plate to create braking and releasing effect for said tape, said brake plate being a plastic-made frame member having a lower stopping portion shaped corresponding to a surface curvature of said tape, a transverse cantilever extending from a lateral side of said brake plate through a central portion thereof, a free end of said cantilever being formed with a boss, whereby when said brake plate is located in said housing, said boss is engaged with and supported on an upper edge of an integrally formed wall of said housing, and when said driving button is pivoted back and forth, said abutting recess portion thereof pushes an upper edge of said brake plate, making said brake plate plastically displace up and down by two stages; and said pull brake mechanism includes an integrally formed pressing button and a spring, said pressing button including a bottom pressing base and an upper vertical pressing plate, said pressing plate and said pressing base defining a passage for said tape to pass therethrough, a post being disposed on said pressing button for fitting into said spring, a fissure being formed on a lateral wall of said passage, whereby an upper and a lower wall of said passage are able to slightly plastically displace, said pressing button and said spring fitted thereon are placed on a lower side of said housing with said spring fitted in an integrally formed channel of said housing to elastically abut against and press said pressing button downward, making a bottom of said pressing plate press against the surface of said tape.

* * * * *